(12) United States Patent
Enomoto

(10) Patent No.: US 7,433,089 B2
(45) Date of Patent: Oct. 7, 2008

(54) IMAGE PROCESSOR

(75) Inventor: Jun Enomoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1019 days.

(21) Appl. No.: 10/252,820

(22) Filed: Sep. 24, 2002

(65) Prior Publication Data

US 2004/0227978 A1   Nov. 18, 2004

(30) Foreign Application Priority Data

Sep. 27, 2001   (JP)   ............... 2001-296298

(51) Int. Cl.
    H04N 1/04   (2006.01)
(52) U.S. Cl. .............. 358/474; 358/527; 358/530; 382/254; 382/167; 348/222.1; 348/96
(58) Field of Classification Search ............... 358/474, 358/487, 500, 501, 509, 512, 525, 532, 506; 382/167, 254; 348/241, 275, 96, 222.1
    See application file for complete search history.

(56) References Cited

U.S. PATENT DOCUMENTS

| | | | | |
|---|---|---|---|---|
| 5,986,741 | A * | 11/1999 | Kimura | 355/38 |
| 6,323,959 | B1 * | 11/2001 | Toyama et al. | 382/312 |
| 6,339,466 | B1 * | 1/2002 | Matama | 355/52 |
| 6,473,228 | B1 * | 10/2002 | Toshimitsu | 359/368 |
| 6,587,224 | B1 * | 7/2003 | Nabeshima et al. | 358/1.9 |
| 6,603,885 | B1 | 8/2003 | Enomoto | |
| 6,646,760 | B1 | 11/2003 | Hanihara | |
| 6,853,400 | B1 * | 2/2005 | Matama | 348/96 |
| 6,856,429 | B1 * | 2/2005 | Noguchi et al. | 358/1.9 |
| 6,954,284 | B2 * | 10/2005 | Enomoto | 358/1.18 |
| 2001/0041018 | A1 * | 11/2001 | Sonoda | 382/275 |
| 2003/0095197 | A1 * | 5/2003 | Wheeler et al. | 348/241 |

FOREIGN PATENT DOCUMENTS

| | | |
|---|---|---|
| JP | 6-237376 | 8/1994 |
| JP | 9-281613 | 10/1997 |
| JP | 11-225270 | 8/1999 |
| JP | 2000-003437 A | 1/2000 |
| JP | 2000-083157 A | 3/2000 |
| JP | 2000-152067 A | 5/2000 |
| JP | 2000-156785 A | 6/2000 |
| JP | 2002-199410 A | 7/2002 |

OTHER PUBLICATIONS

JP Office Action in Patent Application No. 2002-275855 dated Nov. 20, 2007.

* cited by examiner

*Primary Examiner*—Edward L. Coles
*Assistant Examiner*—Negussie Worku
(74) *Attorney, Agent, or Firm*—Sughrue Mion, PLLC

(57) ABSTRACT

The image processor performs aberration correction processing for correcting aberration due to a photographic lens on input image data obtained from an image optically photographed through the photographic lens of a camera and predetermined image processing on the input image data so as to obtain output image data. The predetermined image processing is performed after the aberration correction processing. Alternatively, The predetermined image processing is performed prior to the aberration correction processing. As a result, the image processor is capable of correcting the aberration due to the lens which degrades the quality of a print without causing any inconvenience, thereby obtaining a high-quality image.

5 Claims, 8 Drawing Sheets

IMAGE PROCESSOR

BACKGROUND OF THE INVENTION

1. Field of the Invention

The present invention belongs to a technical field of an image processor for correcting degradation in image quality due to a photographic lens, which occurs in an image photographed by a film-with-lens camera, a low-price compact camera, a digital camera, and the like, so as to obtain a high-quality image.

2. Description of the Related Art

Conventionally, so-called direct exposure for projecting an image on a film onto a photosensitive material (photographic paper) and then performing plane exposure on the photosensitive material is a main technique in printing of an image photographed on a photographic film (hereinafter, referred to simply as a film) such as a negative film or a reversal film onto a photosensitive material.

On the other hand, a printer utilizing digital exposure, that is, a digital photographic printer has recently been put into practical use. In the digital photographic printer, an image recorded on a film is photoelectrically read out. The readout image is converted to a digital signal, which is then subjected to various image processings so as to obtain image data for recording. A photosensitive material is subjected to scanning exposure with recording light which is modulated in accordance with the obtained image data so as to record an image (latent image), thereby obtaining a (finished) print The digital photographic printer basically includes: an image input device having a scanner (image reader) for photoelectrically reading out an image recorded on a film and an image processor for performing image processing on the readout image so as to convert it to image data for output (exposure condition); and an image output device having a printer (image recorder) for performing scanning exposure on a photosensitive material in accordance with the image data output from the image input device so as to record a latent image and a processor (developing unit) for performing a developing processing on the exposed photosensitive material so as to obtain a print.

In the scanner, reading light emitted from a light source is irradiated onto a film so as to obtain projected light bearing an image photographed on a film. The projected light forms an image through an imaging lens on an image sensor such as a CCD sensor, which is photoelectrically converted so as to read out the image. After performing various processings as the need arises, the readout image is sent to an image processor as image data of the film (image data signal).

The image processor sets an image processing condition from the image data read out by the scanner, and performs the image processing on the image data in accordance with the set condition so as to send the obtained data to a printer as output image data (exposure condition) for image recording.

In a printer, for example, in the case of the one utilizing light beam scanning exposure, a light beam is modulated in accordance with image data sent from the image processor. The modulated light beam is deflected in a main scanning direction while a photosensitive material is being conveyed in a sub-scanning direction perpendicular to the main scanning direction so as to expose (print) the photosensitive material with the light beam bearing the image, thereby forming a latent image. Then, developing processing or the like in accordance with the photosensitive material is performed in the processor so as to obtain a print (photograph) on which the image photographed on the film is reproduced.

In the digital photographic printer, an image can be converted into digital image data, so that an exposure condition upon printing is determined by image data processing. Therefore, the correction for washed-out highlights or flat shadows of an image due to backlight, flash photograph and the like, the sharpness processing (sharpening), the correction for color or density failure and the like are suitably performed so as to obtain a high-quality print which cannot be obtained with conventional direct exposure.

On the other hand, a large amount of low-price handy film-with-lens cameras, compact cameras and the like have been recently shipped. In these low-price film-with-lens cameras and compact cameras, due to cost limit, so-called one-element lens or two-element lens is used to reduce the cost of lens. As a result, there arises a problem in that a photographed image is degraded due to aberrations of a lens such as deterioration of marginal luminosity, lateral chromatic aberration and distortion aberration resulting from lens performance.

As described above, however, since various processes can be performed on input image data by means of digital image data processing in the digital photographic printer, the degradation in image quality due to these types of lens aberration can be corrected to improve the image quality. Various correction methods for a degraded image have been conventionally proposed as described below.

For example, JP 6-237376 A discloses a deteriorated picture recovery system for recording picture quality deterioration information specific to each camera to a laboratory side and selecting the deterioration information based on an identification code of a camera used for the image pickup to recover the photographed deteriorated picture.

JP 9-281613 A discloses a technique for searching an image quality correction information table which is recorded in advance on a laboratory side based on camera type identification information, film kind identification information and photographing time information recorded on a negative film so as to fetch information for correcting image quality deterioration of an image to correct image data, thereby obtaining a high-quality photographic print.

Furthermore, JP 11-225270 A discloses an image processing method for correcting at least one of lateral chromatic aberration, distortion aberration, marginal luminosity, and an image blur from characteristics of a lens used for photographing an image and from positional information of the image so as to output a high-quality image whose image quality deterioration is corrected by image processing, even if the image is photographed with a film-with-lens camera or the like.

As described above, the image deterioration correction by means of digital image processing fairly improves the quality of an image photographed even with a film-with-lens camera and the like. However, an inconvenience occurs in image quality after performing correction processing, depending on a combination of these image deterioration correction processings and other image processings. For example, in the case where the soft focus processing is followed by the marginal luminosity correction, an inconvenience sometimes occurs in an output image, such as the occurrence of pseudo contours. Thus, there is a room to further improve the conventional attempts of improving image quality.

SUMMARY OF THE INVENTION

In view of the above problems, the present invention is made to further improve the conventionally proposed image quality deterioration correction methods and therefore has an object of providing an image processor capable of correcting aberration due to a lens which degrades the quality of a print without causing any inconvenience, thereby obtaining a high-quality image.

In order to attain the object described above, the first aspect of the present invention provides an image processor comprising: means for performing aberration correction processing for correcting aberration due to a photographic lens on input image data obtained from an image optically photographed through the photographic lens of a camera; and means for performing predetermined image processing on the input image data so as to obtain output image data, wherein the predetermined image processing is performed after the aberration correction processing.

Preferably, the predetermined image processing is soft focus processing, the soft focus processing being performed after the aberration correction processing.

Preferably, the predetermined image processing is monotone processing, the monotone processing being performed after the aberration correction processing.

Preferably, in the case where the predetermined image processing is mask processing, the mask processing is performed in any one of two ways: a mask image is produced from image data to be subjected to the aberration correction processing and the aberration correction processing is performed on the image data and the mask image, after which the mask processing is performed; and the aberration correction processing is performed on the image data and the mask image is produced from the image data which has been subjected to the aberration correction processing, after which the mask processing is performed.

Preferably, in the case where the predetermined image processing is processing requiring an approximate position to be specified in advance so as to perform the image processing, the predetermined image processing is performed in any one of two ways: the approximate position is specified in consideration of a shift of a specified position due to the aberration correction processing, and the aberration correction processing is performed, after which the predetermined image processing is performed; and the aberration correction processing is performed on the image data, and the approximate position is specified to the image data which has been subjected to the aberration correction processing, after which the predetermined image processing is performed.

Preferably, the predetermined image processing is one of red-eye correction processing, cross filter processing, and dust/flaw elimination processing.

Preferably, the predetermined image processing is sharpness processing, the sharpness processing being performed after the aberration correction processing.

Preferably, the aberration correction processing is followed by synchronization when the input image data is synchronized prior to performing the predetermined image processing.

In order to attain the object described above, the second aspect of the present invention provides an image processor comprising: means for performing aberration correction processing for correcting aberration due to a photographic lens on input image data obtained from an image optically photographed through the photographic lens of a camera; and means for performing predetermined image processing on the input image data so as to obtain output image data, wherein the predetermined image processing is performed prior to the aberration correction processing.

Preferably, the predetermined image processing includes dust/flaw elimination processing, the dust/flaw elimination processing being performed prior to the aberration correction processing.

DESCRIPTION OF THE PREFERRED EMBODIMENTS

Hereinafter, an image processor according to the present invention will be described in detail, based on the preferred embodiments illustrated in the accompanying drawings.

Figure 1:
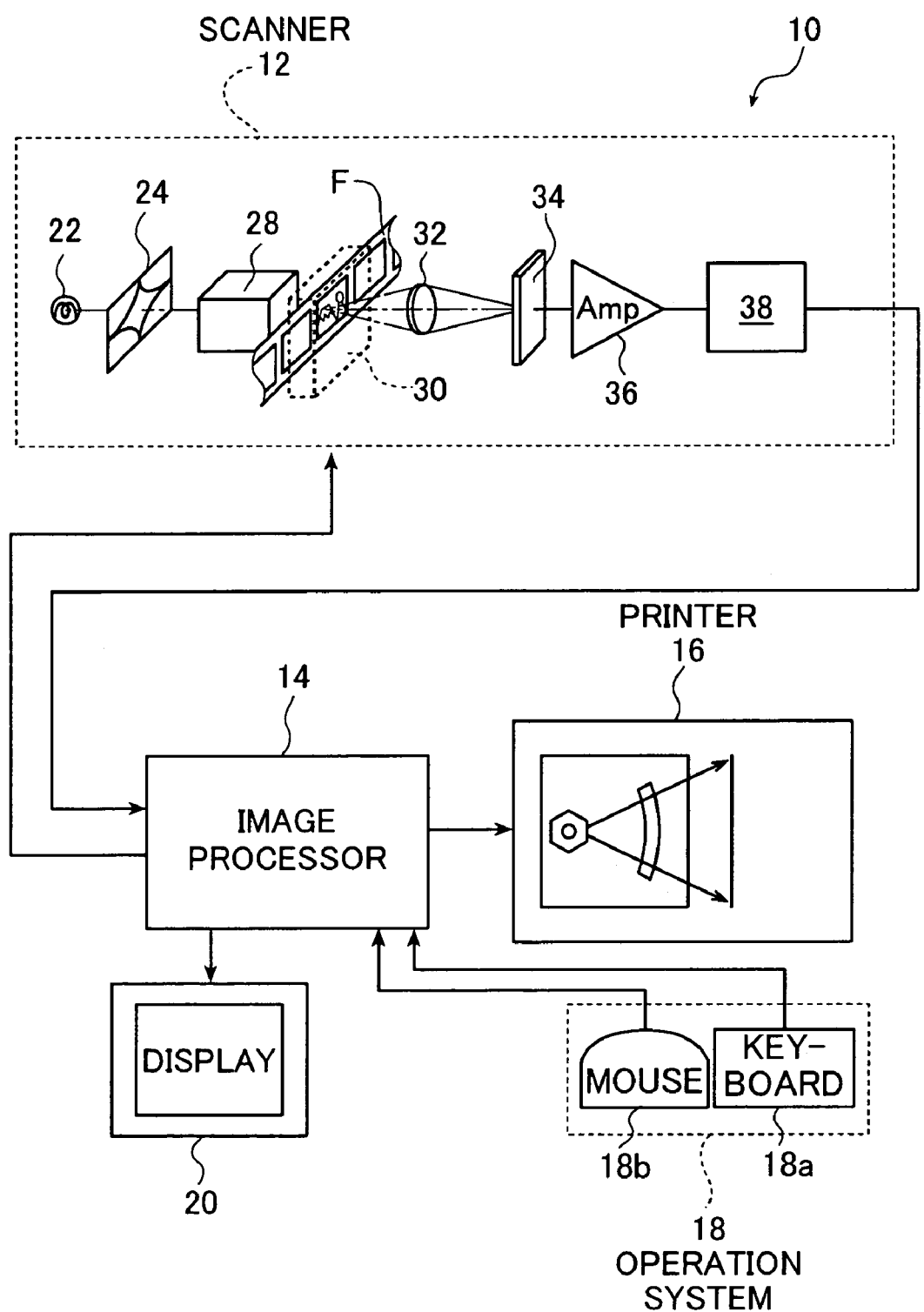
FIG. 1 is a block diagram showing an outline of a digital photographic printer including an image processor according to the present invention.

FIG. 1 is a block diagram showing an outline of a digital photographic printer including an image processor according to the present invention.

The digital photographic printer (hereinafter, referred to simply as a photo printer 10) shown in FIG. 1 basically includes: a scanner (image reader) 12 for photoelectrically reading out an image photographed on a film F; an image processor 14 for performing the image processing of readout image data (image information), the operation, the control and the like of the entire photo printer 10; and a printer 16 for exposing a photosensitive material (photographic paper) with a light beam modulated in accordance with the image data output from the image processor 14 and for performing development processing so as to output it as a (finished) print.

An operation system 18 including a keyboard 18a and a mouse 18b for inputting (setting) various conditions, selecting and instructing a specific processing, and inputting an instruction for color/density correction or the like, and a display 20 for displaying an image read out by the scanner 12, various operational instructions, a screen for setting/registering conditions and the like are connected to the image processor 14.

The scanner 12 photoelectrically reads out an image photographed on the film F and the like in a frame-by-frame manner. The scanner 12 includes a light source 22, a variable diaphragm 24, a diffusion box 28 for uniformizing reading light incident on the film F in a plane direction of the film F, an imaging lens unit 32, an image sensor 34 having line CCD sensors corresponding to the reading of the respective R (red), G (green) and B (blue) images, an amplifier 36, and an A/D (analog/digital) converter 38.

A dedicated carrier 30, which is removably attached to a main body of the scanner 12, is prepared in the photo printer 10 in accordance with the kind or the size of a film such as an APS (Advanced Photo System) or a 135-size negative (or reversal) film, the form of a film such as a strip or a slide, and the like. By replacing the carrier 30 with another, various kinds of films can be used to deal with various kinds of processings. An image (frame) photographed on a film, which is provided for print production, is conveyed to a predetermined reading position by the carrier 30.

In such a scanner 12, upon reading the image photographed on the film F, reading light emitted from the light source 22, whose light amount is adjusted by the variable diaphragm 24, is incident on the film F placed at a predetermined reading position by the carrier 30 so as to be transmitted therethrough. As a result, the projected light bearing the image photographed on the film F is obtained.

The carrier 30 is compatible with the APS film F (cartridge) and places the film F at a predetermined reading position while conveying the film F so that a longitudinal direction of the film F is set to be identical with a sub-scanning direction perpendicular to a direction (main scanning direction) in which the line CCD sensors in the image sensor 34 extend. The reading light is incident on the film F while the film F is placed at a reading position by the carrier 30 so as to be conveyed in a sub-scanning direction. As a result, the film F goes through two-dimensional slit scanning with the reading light so as to read out an image of each frame photographed on the film F.

As is known, a magnetic recording medium is formed on the APS film. For example, various types of information such as the kind of the film, the sensitivity, the photographic lens, the diaphragm upon photographing, and with or without flash upon photographing are recorded on the magnetic recording medium in advance. Furthermore, by a camera, a developing device, and the carrier 30, various information is written on the magnetic recording medium and is also read out therefrom as the need arises In the image processor 14, aberration correction processing is performed by using the information. For the films other than the APS film, the information may be recorded on a film or a cartridge by a predetermined magnetic or optical method, which is then read out for use in the aberration correction processing.

In this manner, the reading light transmits through the film F held by the carrier 30 so as to be projected light bearing the image The projected light forms an image on a light receiving face of the image sensor 34 by the imaging lens unit 32.

The image sensor 34 is a so-called three-line color CCD sensor for respectively reading out an R image, a G image and a B image. Each line CCD sensor is elongated in the main scanning direction as described above. The projected light of the film F is decomposed into three primary colors R, G and B by the image sensor 34 so as to be photoelectrically read out.

An output signal of the image sensor 34 is amplified in the amplifier 36, and is converted into a digital signal by the A/D converter 38 so as to be sent to the image processor 14.

In the scanner 12, the image reading is performed twice so as to read out the image photographed on the film F, i.e., prescan for reading out the image at a low resolution and fine scan for obtaining image data of an output image.

The prescan is performed under a preset reading condition for prescan so that the scanner can read out all images of the film to be read out by the scanner 12 without causing the saturation of the image sensor 34. On the other hand, the fine scan is performed under a reading condition of fine scan which is set for each frame based on the prescan data so that the image sensor 34 is saturated at a slightly low density than the minimum density of the image (frame) of interest.

An output signal of the prescan basically has the same data as an output signal of the fine scan except for differences in resolution and output level.

The scanner 12 constituting the image inputting device according to this embodiment is not limited to a scanner for performing such slit scanning. The scanner 12 may also be a scanner for performing plane exposure to read out the entire surface of an image of one frame at a time.

In such a case, for example, an area CCD sensor is utilized, and means for inserting color filters of R, G and B is provided between the light source and the film F. The reading of the image after insertion of the color filters is sequentially performed with the respective filters of R, G and B so as to decompose the image photographed on the film F into three primary colors for reading.

As described above, the digital signal output from the scanner 12 is output to the image processor 14.

Figure 2:
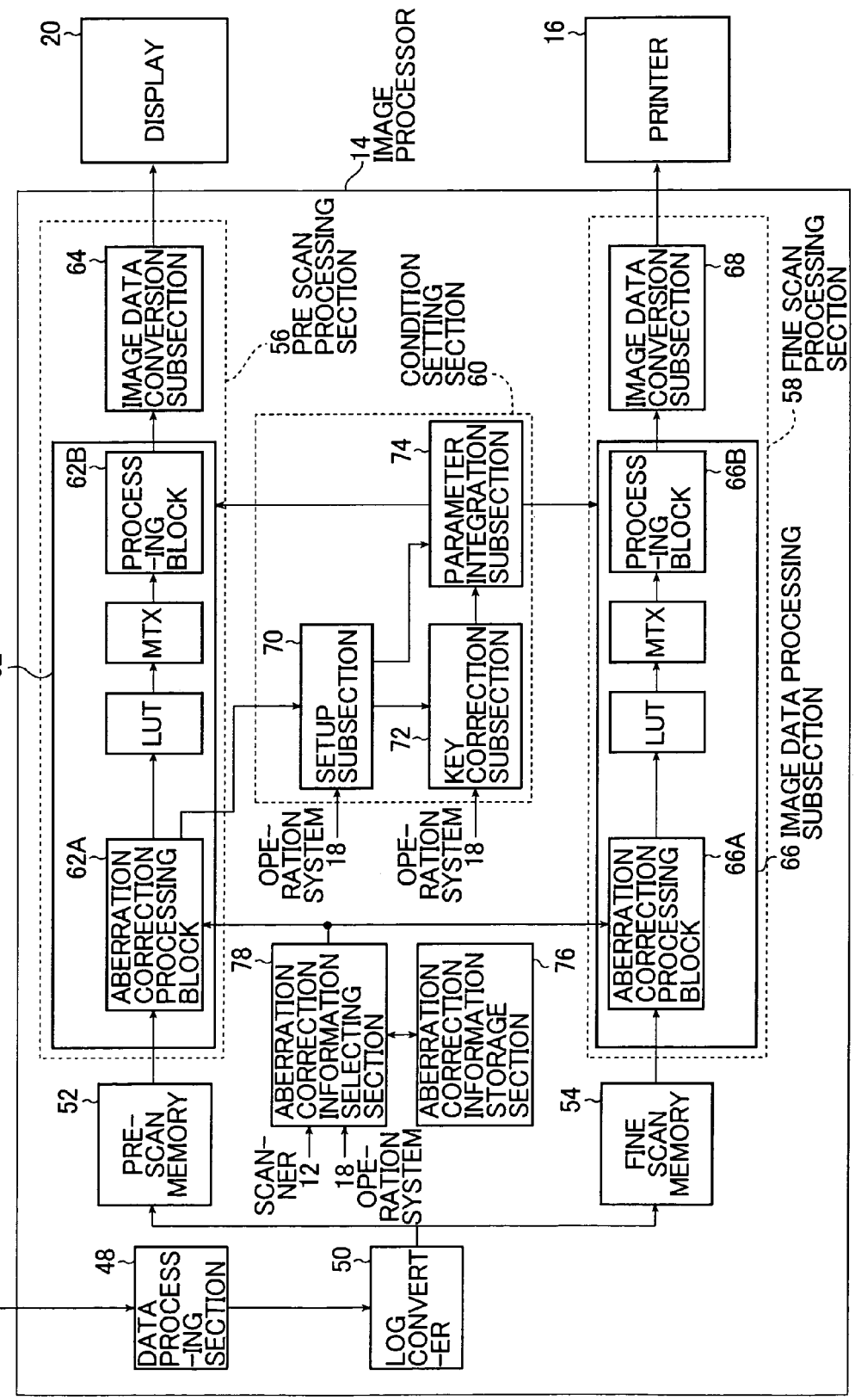
FIG. 2 is a block diagram schematically showing the image processor according to the present invention.

FIG. 2 is a schematic block diagram showing the image processor 14 according to the present invention. The image processor 14 includes a data processing section 48, a Log converter 50, a prescan (frame) memory 52, a fine scan (frame) memory 54, a prescan processing section 56, a fine scan processing section 58, a condition setting section 60, an aberration correction information storage section 76 and an aberration correction information selecting section 78.

FIG. 2 mainly shows the sections related to image processing. Besides the above-described sections, the image processor 14 includes a CPU for controlling and managing the entire photo printer 10 including the image processor 14, a memory for storing information necessary for the operation of the photo printer 10, and the like. The operation system 18 and the display 20 are connected to each section via the CPU (CPU bus) and the like.

Each of digital signals of R, G, and B output from the scanner 12 is subjected to predetermined data processings such as dark current correction, defective pixel correction, and shading correction in the data processing section 48. The processed digital signal is converted by the Log converter 50 to digital image data (density data) so that prescan data is memorized (stored) in the prescan memory 52 while the fine scan data is memorized (stored) in the fine scan memory 54.

The prescan data stored in the prescan memory 52 is read out to the prescan processing section 56 including an image data processing subsection 62 (hereinafter, referred to simply as the processing subsection 62) and an image data conversion subsection 64 whereas the fine scan data stored in the fine scan memory 54 is read out to the fine scan processing section 58 including an image data processing subsection 66 (hereinafter, referred to simply as the processing subsection 66) and an image data conversion subsection 68.

As the predetermined image processings in the processing subsections 62 and 66, color balance adjustment, contrast adjustment (gradation processing), brightness correction, dodging processing (compression/expansion of a density dynamic range), color saturation correction, sharpness (sharply defining) processing and the like are given as examples. These processings may be performed by a known method utilizing a suitable combination of a computation, processing with an LUT (look-up table), a matrix (MTX) computation, processing with a filter, and the like. In the illustrated example, the color balance adjustment, the brightness correction and the contrast correction are performed with the LUT whereas the color saturation correction is performed with the MTX. In addition to these processings, the sharpness processing and the dodging processing are performed in processing blocks 62B and 66B in accordance with the instruction given by an operator, image data, and the like.

An aberration correction processing block 62A for prescan processing and an aberration correction processing block 66A for fine scan processing are respectively placed before the LUTs of the processing subsections 62 and 66, respectively.

In the image processor 14 according to the present invention, the aberration of the image photographed on the film P due to a lens is corrected by digital image data processing (aberration correction processing) in each of the aberration correction processing blocks 62A and 66A based on aberration correction information corresponding to lens characteristics, prior to performing the predetermined image processing. Thereafter, various predetermined image processings are performed. As a result, a print, on which a high-quality image is reproduced, can be stably output, eliminating the inconvenience occurring due to aberration correction processing.

In some predetermined image processings, it is preferred to perform the predetermined image processing prior to performing the aberration correction processing for correcting the aberration due to a lens, that is, in the reverse order of the above process. This order of processings will be described below. Alternatively, the aberration correction processing may be performed only on the fine scan data without providing the aberration correction processing block 62A for prescan processing.

The image data conversion subsection 68 converts the image data processed through the processing subsection 66 by use of, for example, a 3D (three-dimensional)-LUT, and the like so as to supply it to the printer 16 as image data corresponding to image recording by the printer 16.

The image data conversion subsection 64 thins the image data processed through the processing subsection 62 as the need arises, and converts it in a similar manner by use of the 3D-LUT and the like to image data corresponding to display on the display 20, so that the display 20 displays the image data.

The processing conditions in both processings are set in the condition setting section 60 described below.

The condition setting section 60 sets various processing conditions in the prescan processing section 56 and the fine scan processing section 58. The condition setting section 60 includes a setup subsection 70, a key correction subsection 72 and a parameter integration subsection 74.

The setup subsection 70 uses the prescan data and the like to set a reading condition of fine scan so as to supply it to the scanner 12. The setup subsection 70 produces (computes) image processing conditions of the prescan processing section 56 and the fine scan processing section 58 so as to supply them to the parameter integration subsection 74. More specifically, the setup subsection 70 reads out the prescan data from the prescan memory 52 so as to produce a density histogram or to calculate the amount of image characteristics such as a mean density, a highlight (minimum density) and a shadow (maximum density) so as to determine a reading condition of fine scan. Moreover, the setup subsection 70 sets image processing conditions such as those for color balance adjustment or gradation adjustment in the above-described image data processing subsection 66 (62) in accordance with the instruction by an operator which is given as the need arises.

The key correction subsection 72 calculates the amount of adjustment for the image processing conditions (for example, the amount of correction for the LUT and the like) in accordance with various instructions input through keys set on the keyboard 18a or through the mouse 18b for adjusting a density (brightness), color, contrast, sharpness and color saturation so as to supply the amount of adjustment to the parameter integration subsection 74.

The parameter integration subsection 74 receives the amount of correction for the LUT and the like calculated by the key correction subsection 72 or the image processing conditions set by the setup subsection 70 so as to set them to the processing subsection 62 of the prescan processing section 56 and the processing subsection 66 of the fine scan processing section 58. Furthermore, the parameter integration subsection 74 corrects (adjusts) the image processing conditions set to the respective parts or resets the image processing conditions, in accordance with the amount of adjustment calculated in the key correction subsection 72.

The above-described aberration correction information storage section 76 stores in advance the aberration correction information corresponding to the lens characteristics of a photographic lens of a camera.

The aberration correction information selecting section 78 selects, from the aberration correction information stored in the aberration correction information storage section 76, the aberration correction information corresponding to information for identifying the lens characteristics acquired by the scanner 12 or input by an operator through the operation system 18.

The selected aberration correction information are sent to an aberration correction processing block 62A of the prescan processing subsection 62 and an aberration correction processing block 66A of the fine scan processing subsection 66, respectively.

The functions of the image processor 14 will be described below in detail with respect to the image processor of the present invention for each of various predetermined image processings with reference to the drawings.

Figure 3:
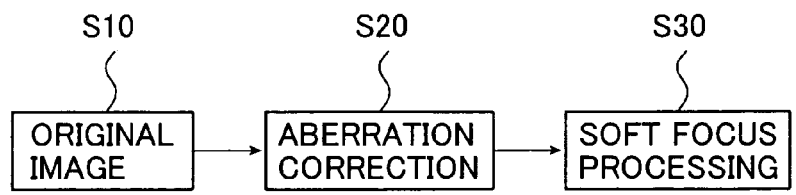
FIG. 3 is a processing block diagram showing schematic processing in the case where soft focusing processing is performed as predetermined image processing in an embodiment of the present invention.

First, the case where the soft focus processing is performed as the predetermined image processing will be described. FIG. 3 is a processing block diagram in the case of the soft focus processing.

As shown in FIG. 3, in the case where the soft focus processing is performed as the predetermined image processing, first, at a processing step S10, image data of an original image is input. More specifically, prescan data of the original image read out from the film F by the scanner 12 is stored as input image data in the prescan memory 52 of the image processor 14 whereas its fine scan data is stored as input image data in the fine scan memory 54. At this point, lens information or photographing time information is acquired from the film F. The aberration correction processing block 62A of the prescan data processing subsection 62 reads out the prescan data from the prescan memory 52.

Next, the aberration correction processing is performed at a processing step S20. As the aberration correction, marginal luminosity correction, distortion aberration correction, lateral chromatic aberration correction, blurring correction, and the like are given as examples. In the case where the soft focus processing is performed as the predetermined image processing, it is particularly efficient to perform the soft focus processing after performing the marginal luminosity correction as the aberration correction.

The aberration correction processing for the prescan data is performed in the aberration correction processing block 62A of the processing subsection 62. Thereafter, the predetermined image processing is performed so that its result is displayed on the display 20 In the case where an operator judges its result as OK, the aberration correction processing is performed on the fine scan data in the processing subsection 66 for fine scan data by using the processing condition obtained by modifying the processing condition for fine scan as the need arises.

The aberration correction processing block 62A performs the aberration correction on the prescan data read out from the prescan memory 52 At this point, the aberration correction information selecting section 78 selects the corresponding aberration correction information from the aberration correction information storage section 76 based on the lens information and the like acquired from the film F so as to send it to the aberration correction processing block 62A. The aberration correction processing is not particularly limited, and is executed by a known aberration correction method.

For example, in the case where the marginal luminosity correction is to be performed, the aberration correction information for marginal luminosity correction (more specifically, for example, the amount of correction D is represented by a high-order polynomial of x and y on the positional coordinates (x, y) of an image where x is a first direction of a photographed image and y is a second direction thereof, and the like) is selected based on the lens information and the like so as to use this correction information to perform the marginal luminosity correction processing.

Next, at a processing step S30, the soft focus processing is performed in the processing block 62B on the image data which has undergone the aberration correction processing, as one of the predetermined image processing.

The soft focus processing is not also particularly limited, and known soft focusing processing can be used. For example, a blurring mask image is produced from the image data which has undergone the aberration correction processing and is converted by using a LUT (look-up table) exhibiting predetermined soft focus effects so as to obtain a blurring image signal. Then, the blurring image signal and an original image signal (after the aberration correction processing) are synthesized to produce a soft focus image.

The result of the processing is displayed on the display 20. When an operator sees the result and confirms it, similar processing is performed for the fine scan data in the processing subsection 66. More specifically, the aberration correction processing is performed on the fine scan data in the aberration correction processing block 66A. Thereafter, the soft focus processing is performed in the processing block 66B.

If the aberration correction processing is performed after the soft focus processing, the degree of soft focus may be altered, or the blurring due to poor connection between image regions occurs to generate pseudo contours in the edge of the image region. However, when the aberration correction processing (in particular, the marginal luminosity correction processing) is followed by the soft focus processing, such an inconvenience does not occur.

Next, the case where monotone processing is performed as the predetermined image will be described. The "monotone processing" herein means the production of a black and white image or a sepia image from a color image. Also in this case, the aberration correction processing is performed prior to the monotone processing. The effects are particularly enhanced in the case where distortion aberration correction or lateral chromatic aberration correction is performed as the aberration correction processing.

Figure 4:
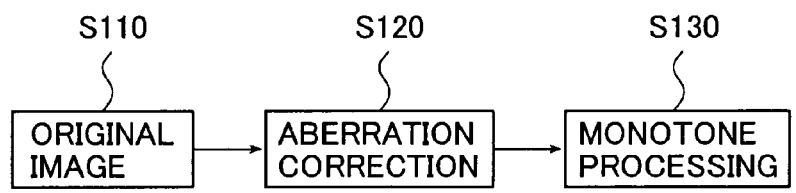
FIG. 4 is a processing block diagram showing schematic processing in the case where monotone processing is performed as predetermined image processing also in an embodiment of the present invention.

FIG. 4 is a processing block diagram in the case where the monotone processing is performed. As shown in FIG. 4, a flow of the monotone processing is basically the same as that of the soft focus processing; the soft focus processing at the processing step S30 in FIG. 3 is replaced by the monotone processing.

At a processing step S110, image data (prescan data) of an original image is read out from the prescan memory 52 to the aberration correction processing block 62A. Then, at a processing step S120, the aberration correction processing, for example, the distortion aberration correction, the lateral chromatic aberration correction, or the like is performed.

A method of the distortion aberration correction or the lateral chromatic aberration correction is not particularly limited, and therefore a known method thereof may be used. For example, the characteristics of distortion aberration or lateral chromatic aberration of a lens can be approximated to a certain degree by a cubic function using an optical axis of the lens, that is, a distance from the center of an image photographed on the film F (for example, represented on the x and y coordinates) as a parameter. The function showing the characteristics of distortion aberration or lateral chromatic aberration can be used to correct these aberrations.

Next, at a processing step S130, the monotone processing is performed as the predetermined image processing on the image data which has undergone the aberration correction processing. In the case where the monotone processing is performed, the processing block 62B uses a matrix (MTX) and a look-up table (LUT), in which a factor (parameter) is preset for monotone processing, to convert the image data which has undergone the aberration correction processing, thereby obtaining a black and white image or a sepia image from a color image.

For example, as the MTX, a matrix expressed by the following transform expressions is used.

$R0=0.3R+0.59G+0.11B$ $G0=0.3R+0.59G+0.11B$ $B0=0.3R+0.59G+0.11B$

The thus processed prescan data is displayed on the display 20. After confirmation by an operator, the aberration correction processing is next performed on the fine scan data in a similar manner, followed by the monotone processing in the processing subsection 66 for the fine scan data.

If the aberration correction (in particular, the distortion aberration correction and the lateral chromatic aberration correction) is performed after the monotone processing, the color deviation occurs in a sepia image, or a black and white image is perceived as a blurring image in some cases, for example. By performing the monotone processing after the aberration correction as described above, such an inconvenience can be prevented from occurring.

Figure 5A:
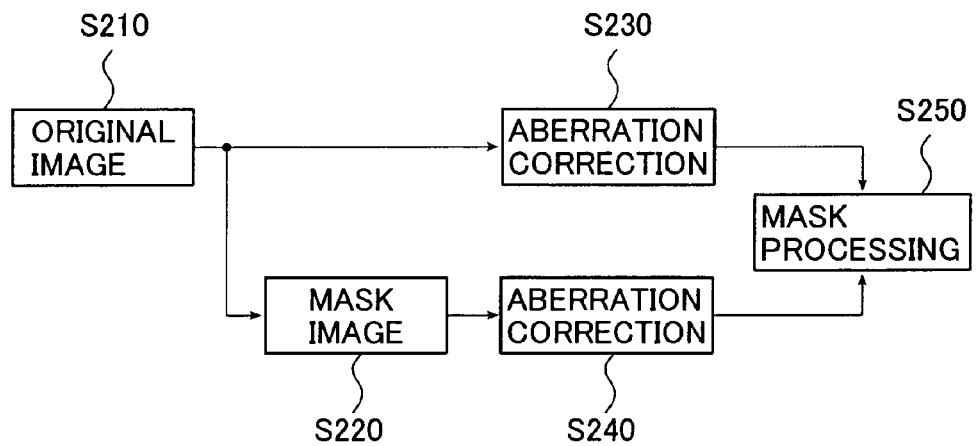
FIGS. 5A and 5B are processing block diagrams, each showing schematic processing in the case where mask processing is performed as predetermined image processing also in an embodiment of the present invention.
Figure 5B:
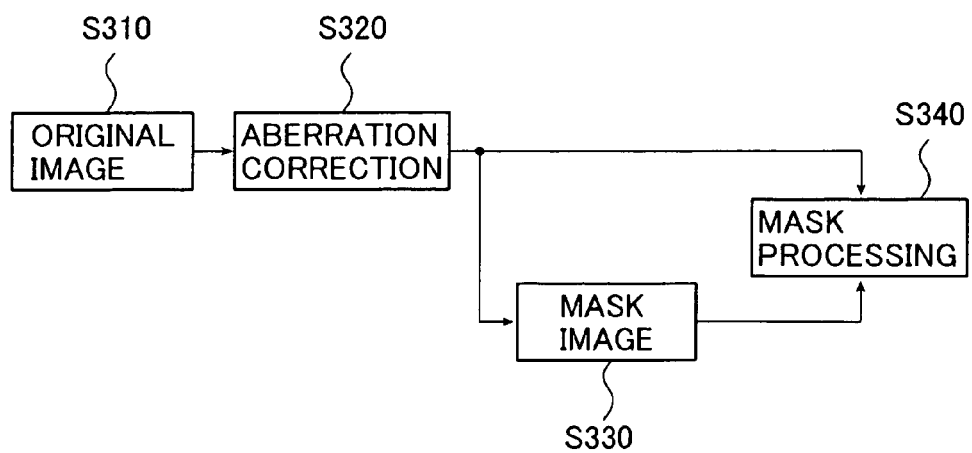

Next, the case where mask processing (image synthesis) is performed as the predetermined image processing will be described. FIGS. 5A and 5B are processing block diagrams in the case where the mask processing is performed. There are two ways for performing the mask processing. In one way, as shown in FIG. 5A, the mask processing may be performed after a mask image is produced from an original image so that the aberration correction is performed respectively on the mask image and the original image. In the other way, as shown in FIG. 5B, the mask processing may be performed after a mask image is produced from an image which has undergone the aberration correction.

Figure 6:
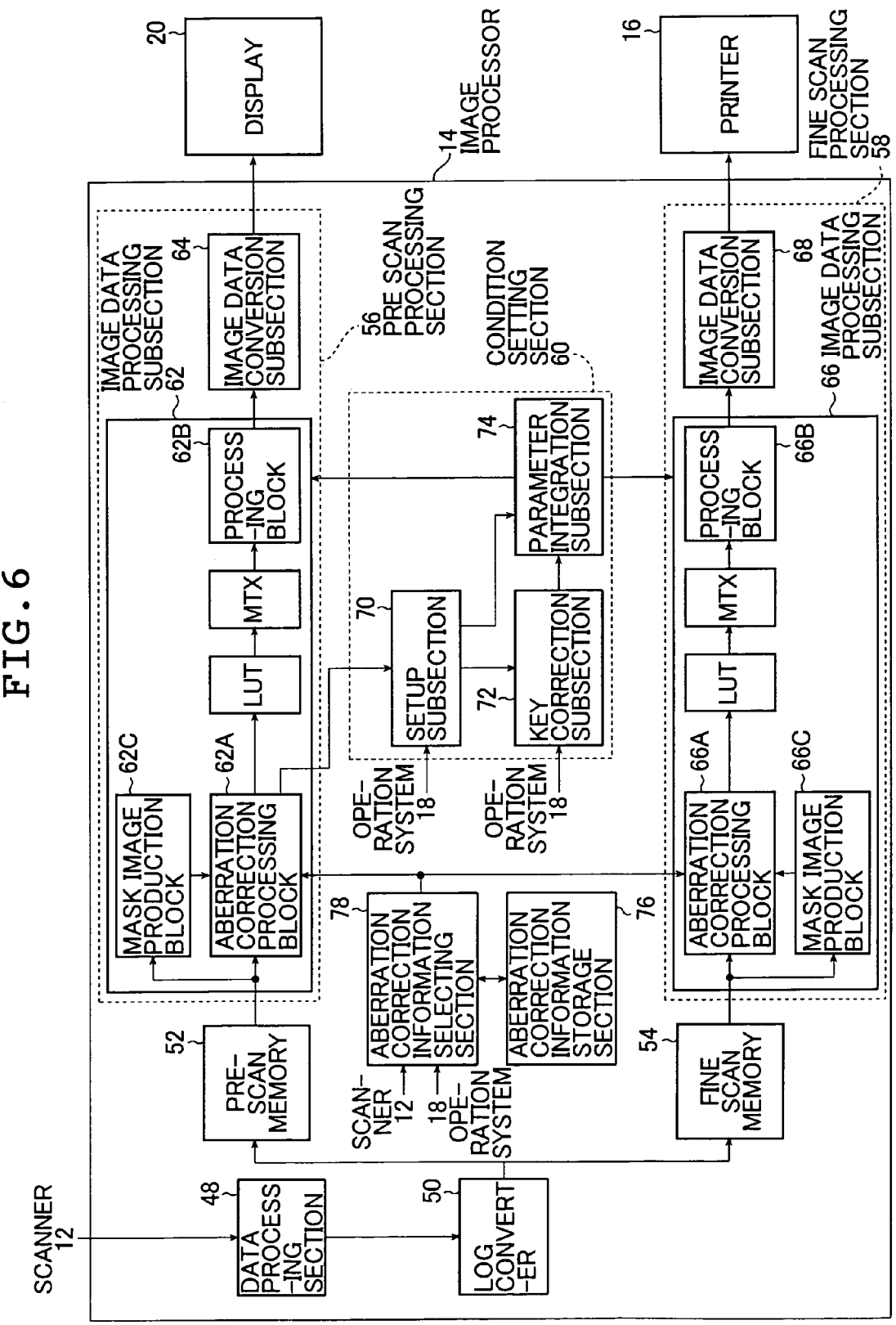
FIG. 6 is a block diagram schematically showing an image processor according to the present invention, for performing the mask processing shown in FIGS. 5A and 5B.

As shown in FIG. 5A, in the case where the mask processing is performed after a mask image is produced from an original image and the aberration correction is performed on the mask image and the original image, the image processor 14 for executing such mask processing may be constituted as shown in FIG. 6, for example. More specifically, a mask image production block 62C is provided between the prescan memory 52 and the aberration correction processing block 62A of the processing subsection 62 while a mask image production block 66C is provided between the fine scan memory 54 and the aberration correction processing block 66A of the processing subsection 66.

The mask image production block 62C receives the prescan data from the prescan memory 52 so as to produce a predetermined mask image therefrom. Then, the mask image production block 62C passes the predetermined mask image to the aberration correction processing block 62A. The mask image production block 66C performs the same processing.

In the case where a mask image is produced from the image data which has undergone the aberration correction as shown in FIG. 5B, the mask image production blocks 62C and 66C are provided before the blocks 62B and 66B, respectively (alternatively, only the mask image production block 62C is provided before the processing block 66B) in FIG. 6.

The case where the aberration correction is performed also on the mask image produced from the original image, followed by the mask processing as shown in FIG. 5A will be described. Herein, the mask processing means processing for producing a mask image, such as face expression processing including face extraction or hypertone processing (dodging processing), and for then composing the mask image and image data.

At a processing step S210, the prescan data (original image) which has been read out from the film F by the scanner 12 to be stored in the prescan memory 52 is input to the mask image production block 62C and the aberration correction processing block 62A, respectively.

Next, at a processing step S220, a mask image, which is adapted to the predetermined mask processing, is produced from the original image in the mask image production block 62C. The produced mask image is sent to the aberration correction processing block 62A. On the other hand, at a processing step S230, the aberration correction processing block 62A performs the aberration correction processing on the input original image. It is particularly effective to perform the distortion aberration correction and the lateral chromatic aberration correction as the aberration correction in this case.

At a processing step S240, the aberration correction processing block 62A also performs the aberration correction processing on the mask image sent from the mask image production block 62C. At a processing step S250, the original image and the mask image, which have undergone the aberration correction processing, are composed in the processing block 62B so as to perform the mask processing.

In the case where the mask image is produced from the image data which has undergone the aberration correction as shown in FIG. 5B, the original image is first fetched at a processing step S310. At a step S320, the aberration correction processing is performed on the original image data in the aberration correction processing block 62A. At a step S330, a mask image is produced from the image data which has undergone the aberration correction in a mask image production part (not shown) provided before the processing block 62B Then, at a processing step S340, the mask processing (synthesis) is performed in the processing block 62B.

In this manner, the mask processing is performed after the aberration correction (in particular, the distortion aberration correction and the lateral chromatic aberration correction), so that an inconvenience, which occurs in the case where the aberration correction is performed after the mask processing, can be avoided.

Figure 7A:
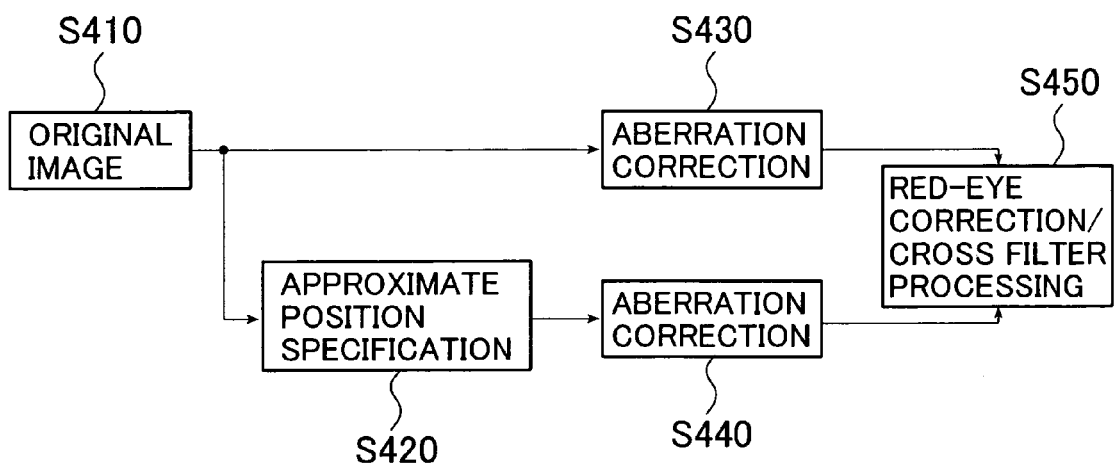
FIGS. 7A and 7B are processing block diagrams, showing schematic processing in the case where red-eye correction or cross filter processing is performed as predetermined image processing also in an embodiment of the present invention.
Figure 7B:
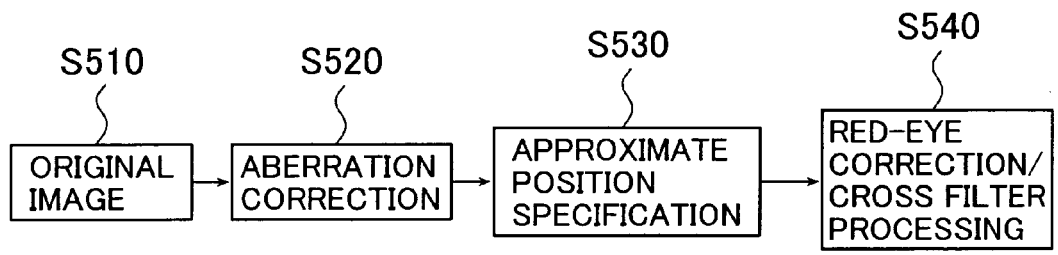

Next, the case where red-eye correction-processing or cross filter processing is performed as the predetermined image processing will be described. FIGS. 7A and 7B are processing block diagrams in the case where the red-eye correction processing or the cross filter processing is performed.

The "red-eye correction processing" herein means the processing for correcting red eyes to have a normal color of eyes by performing digital image processing with respect to socalled red eye phenomenon, that is, human eyes are photographed as having a red color in flash photographing of a human and the like. The "cross filter processing" modifies an image tone of an image to be processed to have a similar image tone to that of an image which is photographed by using a special filter such as a cross filter. More specifically, a bright area, in which highlight points in the image to be processed exist in a concentrated manner, is extracted so as to produce flux data for adding to an image a similar flux as that added to an image by photographing with a cross filter and the like, regarding the extracted bright region as a reference. The produced flux data is composed on image data.

In both of the red-eye correction processing and the cross filter processing, it is necessary to specify a predetermined position in an image which is to be subjected to the processing, such as the position of human red eyes to be corrected or the position of a bright area in which a flux is to be composed. Therefore, if the aberration correction such as the distortion correction is performed after the red-eye correction or the cross filter processing, an inconvenience occurs in that the specified position is shifted. Therefore, also in the case of these image processings, the above inconvenience can be prevented from occurring by performing the aberration correction followed by the predetermined image processing such as the red-eye correction processing or the cross filter processing.

Also in the case where the red-eye correction processing or the cross filter processing is performed, there are two ways of performing such processing as in the case of the above-described mask processing. More specifically, as shown in FIG. 7A, an approximate position, on which the processing is to be performed later, is specified with respect to an original image. After the aberration correction is performed both on the original image and the image in which the approximate position is specified, the predetermined image processing such as the red-eye correction is performed. In the other way, as shown in FIG. 7B, after the approximate position is specified with respect to the original image which has undergone the aberration correction, the image processing such as the red-eye correction is performed.

Figure 8:
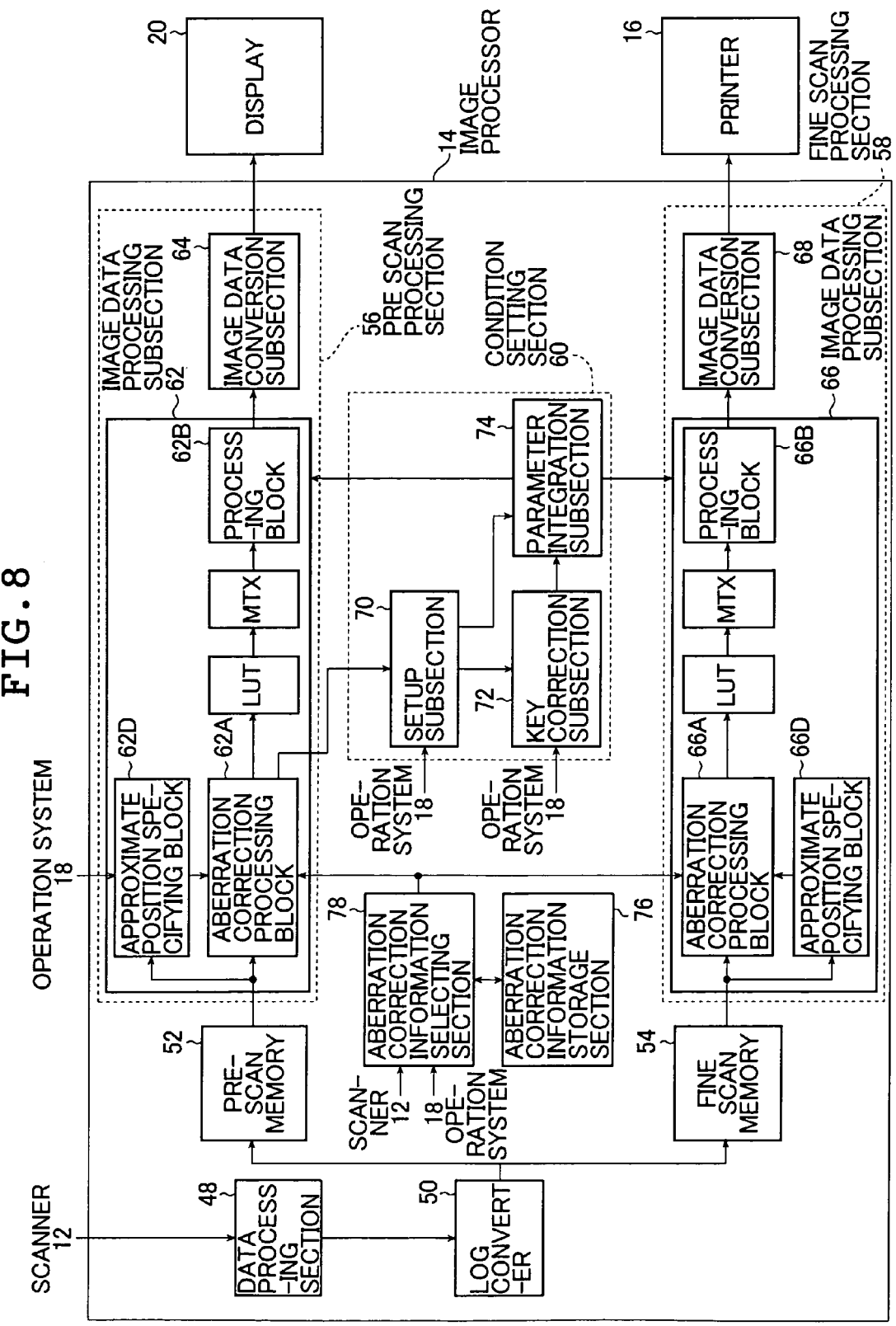
FIG. 8 is a block diagram schematically showing an image processor according to the present invention, for performing the red-eye correction or the cross filter processing shown in FIGS. 7A and 7B.

In the case where the aberration correction is performed on the image in which the approximate position is specified as in FIG. 7A, the image processor 14 for executing the aberration correction may be constituted as shown in FIG. 8, for example. More specifically, an approximate position specifying block 62D is provided between the prescan memory 52 and the aberration correction processing block 62A of the processing subsection 62 while an approximate position specifying block 66D is provided between the fine scan memory 54 and an aberration correction processing block 66A of the processing subsection 66.

The approximate position specifying block 62D receives the prescan data from the prescan memory 52 so as to specify an approximate position of red eyes in a subject or a bright region in which a flux is to be composed. The approximate position may be automatically specified, or may be manually specified by an operator through the operation system 18 while displaying an image on the display 20. Moreover, the approximate position may be re-specified on the fine scan data in the approximate position specifying block 66D. In this case, the data of the position specified for the prescan data may be used for the fine scan data without specifying the approximate position again. In such a case, it is not required to provide the approximate position specifying block 66D for the fine scan data.

On the contrary, only the approximate position specifying block 66D may be provided so as to perform the image processings such as the approximate position specification and the red-eye correction only on the fine scan data.

As shown in FIG. 7B, in the case where the approximate position specification is performed on the image data which has undergone the aberration correction, the approximate position specifying blocks 66D and 62D may be provided before the processing blocks 66B and 62B (alternatively, only the approximate position specifying block 66D is provided before the processing block 66B) in FIG. 8.

As shown in FIG. 7A, the case where the approximate position specification is performed in the original image, which is followed by the aberration correction and then the image processing such as the red-eye correction will be described.

At a processing step S410, the original image (prescan data) is fetched, which is then sent to the approximate position specifying block 62D and the aberration correction processing block 62A. At a processing step S420, an approximate position for use in the later processing is specified with respect to the original image in the approximate position specifying block 62D. The (original) image, in which the approximate position is specified, is sent to the aberration correction processing block 62A. At this point, the approximate position is specified in consideration of a positional shift due to the aberration correction (distortion aberration correction).

At a processing step S430, the aberration correction (distortion aberration correction) is performed on the original image in the aberration correction processing block 62A. At a processing step S440, the aberration correction processing is performed on the image data, in which the approximate position is specified, also in the aberration correction processing block 62A Thereafter, at a step S450, the red-eye correction processing or the cross filter processing is performed in the processing block 62B by using the image data which has undergone the aberration correction processing and the approximate position specification image data.

A method of performing the red-eye correction processing or the cross filter processing is not particularly limited, and therefore, an arbitrary known method can be used. For example, in the case of the red-eye correction processing, a red-eye portion is extracted from a red-eye region where the approximate position is specified so as to convert the red-eye portion to have a predetermined color (for example, black), thereby executing the red-eye correction.

In the case of the cross filter processing, flux data displaying a group of fluxes having predetermined length, thickness, tint, crossing angle of each flux, and the like are produced and composed by a specified parameter or by specification of an operator, with respect to a bright region to which a specified flux to be added.

Similar processings are also performed on the fine scan data in the approximate position specifying block 66D and the processing block 66B.

In the case where the approximate position is specified in the image data which has undergone the aberration correction as shown in FIG. 7B, an original image is first fetched at a processing step S510. At a step S520, the aberration correction processing is performed on the original image data in the aberration correction processing block 62A. At a step S530, the approximate position is specified in the image data which has undergone the aberration correction, in an approximate position specifying block (not shown) provided before the processing block 62B. Then, at a processing step S540, the image processing such as the red-eye correction is performed in the processing block 62B.

In this manner, the aberration correction (in particular, the distortion aberration correction and the lateral chromatic aberration correction) is followed by the image processing such as the red-eye correction, it is possible to avoid an inconvenience due to a positional shift which is caused in the case where the image processing is followed by the aberration correction.

Besides the red-eye correction and the cross filter processing, dust/flaw elimination processing may be manually performed by an operator and the like. More specifically, an operator confirms through display on the display 20 the position of dust or a flaw in the image which has undergone the aberration correction processing so as to specify the position of the dust or flaw with a GUI and the like. As a result, the dust or flaw in the image is automatically corrected in the image processor 14. A correction method is not particularly limited. For example, the image data at the position where dust or a flaw is present may be replaced by the peripheral image data thereof.

Next, the case where template synthesis is performed as the predetermined image processing will be described. More specifically, after correcting the aberration due to a lens, the synthesizing processing for obtaining a predetermined template is performed. As described above, since a predetermined template is synthesized with respect to the image data which has undergone the aberration correction processing, an image to be inserted is subjected to aberration correction. Thus, the template synthesis can be correctly performed at a predetermined position without causing any positional shift and thus without causing any inconvenience in the template image.

Figure 9:
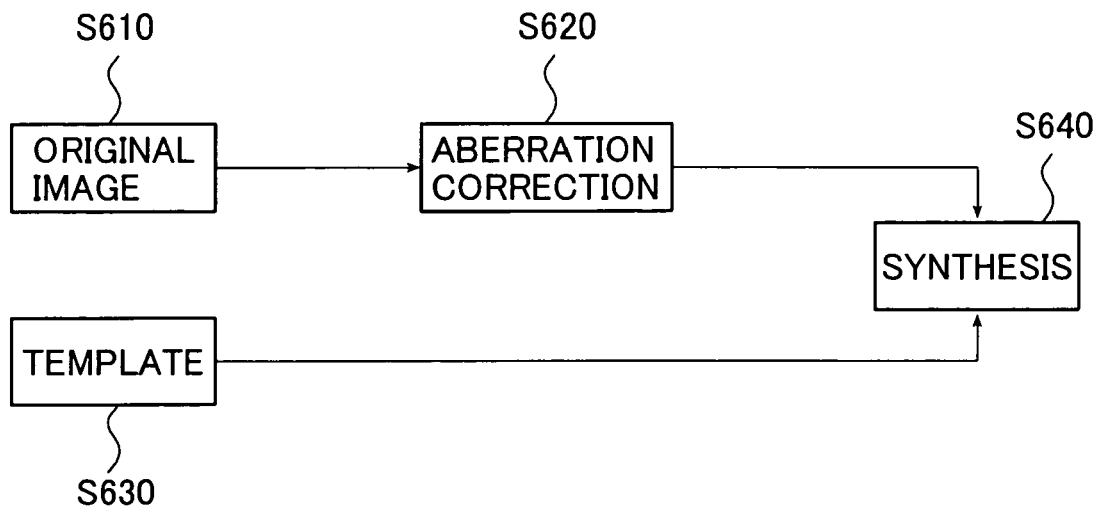
FIG. 9 is a processing block diagram showing schematic processing in the case where template synthesis processing is performed as predetermined image processing also in an embodiment of the present invention.

FIG. 9 is a processing block diagram in the case where the template synthesis is performed.

The template synthesis is basically performed by the image processor 14 shown in FIG. 2. At a processing step S610, an original image (prescan data) read out from the film F by the scanner 12 is input to the aberration correction processing block 62A. At a processing step S620, the aberration correction processing (in particular, the distortion aberration correction and the lateral chromatic aberration correction) is performed on the original image data in the aberration correction processing block 62A.

At a processing step S630, a predetermined template is selected from those prepared in advance, by the information read out from the film F and the like or by the indication by an operator. Then, the predetermined template is sent to the processing block 62B. At a processing step S640, by using this template, the synthesis (template synthesis or insertion synthesis) is performed on the image data which has undergone the aberration correction. As a result, the peripheral image of the region where the template is inserted can be prevented from being distorted.

Similar processing is also performed on the fine scan data in the aberration correction processing block 66A and the processing block 66B.

Next, the case where the lateral chromatic aberration correction is followed by the sharpness processing will be described. The "sharpness processing" is for distinguishing an edge portion and a flat portion of an image from each other so as to emphasize the sharpness for the edge portion to produce a clear profile of the image, thereby obtaining a sharp image. The following sharpness processing is known. For the judgment of the edge portion, for example, color correlation of three colors R, G, and B in each pixel is inspected. When a color correlation value is large, it is judged as the edge portion and therefore the sharpness of the portion is emphasized.

If the sharpness processing is followed by the lateral chromatic aberration correction, an inconvenience occurs in that the edge is shifted to blur the image. Therefore, also in this case, the lateral chromatic aberration correction is followed by the sharpness processing, thereby allowing the inconvenience to be eliminated. For the sharpness processing, it is not necessary to judge the edge portion by using color correlation. However, the method using color correlation is particularly effective.

Figure 10:
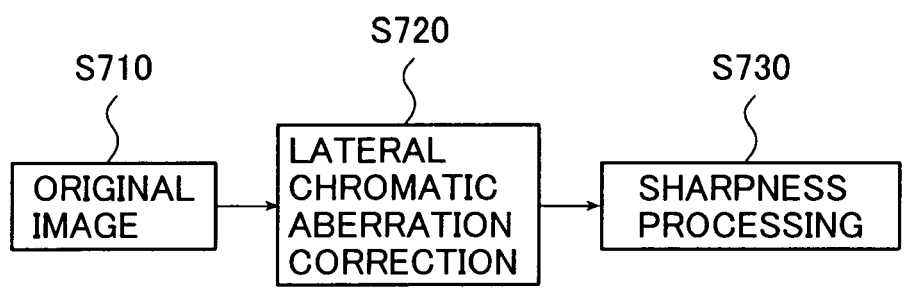
FIG. 10 is a processing block diagram showing schematic processing in the case where sharpness processing is performed as predetermined image processing also in an embodiment of the present invention.

The image processor 14 for executing this processing may be basically that shown in FIG. 2. A processing block diagram is shown in FIG. 10. At a processing step S710, an original image (prescan data) read out from the film F by the scanner 12 to the prescan memory 52 is input to the aberration correction processing block 62A.

At a processing step S720, the aberration correction processing is performed. The image data which has undergone the lateral chromatic aberration correction is sent to the processing block 62B. At a processing step S730, the edge portion judgment and the sharpness processing are performed in the processing block 62B.

At this point, in the processing block 62B, color correlation among three colors R, G and B of each pixel is calculated from the image data which has undergone the lateral chromatic aberration correction so as to judge an edge portion (or a flat portion). More specifically, a portion having a large color correlation value is judged as an edge portion whereas a portion having a small color correlation value is judged as a flat portion.

For the portion judged as the edge portion, its sharpness is emphasized. A method of emphasizing the sharpness is not particularly limited. For example, intermediate and high frequency components obtained by subtracting a low frequency component from each of R, G and B image signals are converted into brightness components based on the YIQ standard. A gain by which an intermediate frequency component and a high frequency component obtained therefrom are multiplied, is increased, thereby executing the sharpness emphasis.

As described above, the aberration correction, in particular, the lateral chromatic aberration correction is followed by the sharpness processing to eliminate inconveniences in the image quality such as a shift, blurring, and the like of an image which occur due to the sharpness processing followed by the aberration correction.

The case where the aberration correction is followed by the synchronization of input image data when synchronizing the input image data prior to performing the predetermined image processings will be described below.

Figure 11:
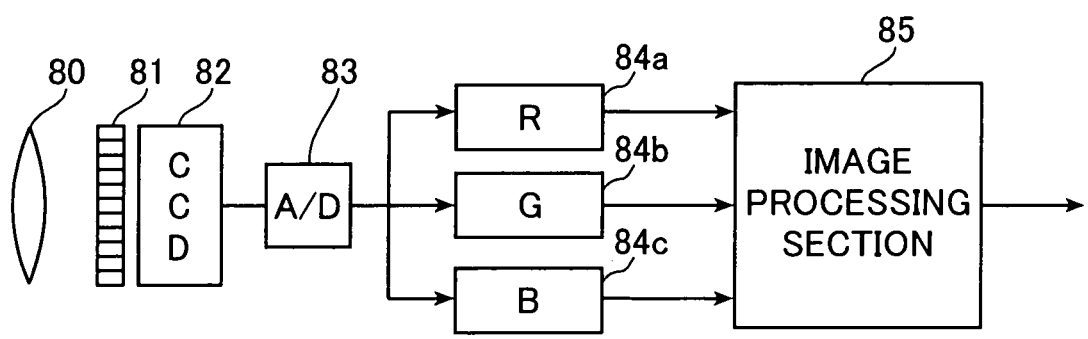
FIG. 11 is a block diagram showing a schematic structure of a color imaging device.

FIG. 11 shows a schematic structure of an example of a color imaging device such as a digital camera. The color imaging device shown in FIG. 11 is a simultaneous, monoplate camera utilizing a color filter array. Such a mono-plate camera can realize compactness in size and low cost because of downsized circuits and hence is used as a digital camera or a home video camera.

As shown in FIG. 11, the color imaging device comprises, for example, a lens 80, a color filter array 81, a CCD 82, an A/D converter 83 and memories 84a, 84b and 84c for respective R, G and B colors and an image processing section 85.

Figures 12A, 12B, 12C, 13:
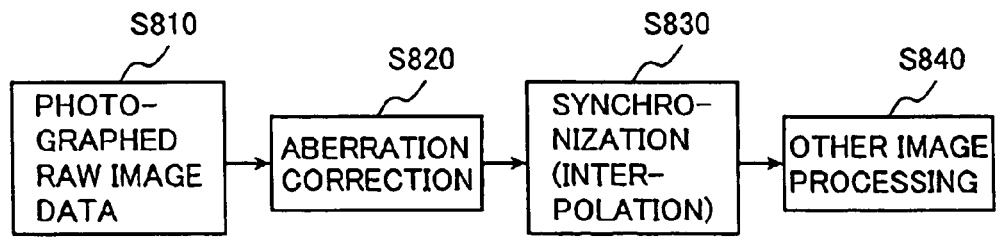
FIG. 12A is a diagram for illustrating Bayer array as an exemplary color filter array.
FIG. 12B is a diagram for illustrating a pixel arrangement for each color in the Bayer array.
FIG. 12C is a diagram for illustrating a pixel arrangement for each color after interpolation has been performed.
FIG. 13 is a processing block diagram showing that aberration correction is followed by synchronization.

There are various types of arrangement of respective colors for the color filter array 81. For example, Bayer array as shown in FIG. 12A is very often used. In this array, G elements whose number is the largest and toward which luminance signal highly contributes are arranged checkerwise and R and B elements are arranged for each row (or column) between the respective adjoining G elements.

Light having passed through the lens 80 and the color filter array 81 is imaged on the CCD 82 and input thereto as image signals, which are then converted from analog signals to digital signals by the A/D converter 83. The digital signals are then subjected to preprocessings such as dark current correction and shading correction, and LOG conversion.

Image data signals for the respective R, G and B colors as shown in FIG. 12B are stored in the memories 84a, 84b and 84c for the respective colors. These image signals are input from the memories 84a, 84b and 84c to the image processing section 85.

In the image processing section 85, the data is read out from the respective memories 84a, 84b and 84c with the same timing and is thus synchronized. Pixels having no image signal are simultaneously interpolated by means of the respective color filters thereby forming one image as shown in FIG. 12C. Thereafter, the image processing section 85 subjects the image data to the predetermined image processings. If the synchronization (and interpolation) are performed prior to the aberration correction, correct data cannot be obtained even if the aberration correction is performed later.

Then, the aberration correction is performed prior to the synchronization (and interpolation).

FIG. 13 shows a flow of the processing. First, at a processing step S810, an image is taken and its image signals are fetched by the CCD 82. The thus fetched photographed raw image data is converted by the A/D converter 83 into digital signals, which are then stored in the memories 84a, 84b and 84c for the respective R, G and B colors.

Then, at a processing step S820, the image processing section 85 inputs the photographed raw image data from the memories 84a, 84b and 84c to perform the aberration correction prior to the synchronization (and interpolation).

The aberration correction is performed on the data immediately after the data has been converted into digital signals by the A/D conversion. It should be noted here that the aberration correction may be performed on the data after the LOG conversion has been performed, or the antilogarithmic data before the LOG conversion is performed. The image data of each color as obtained after the aberration correction has been made is thus stored for each color in the individual memories 84a, 84b and 84c.

At a processing step S830, the image processing section 85 reads out the image data from the respective memories 84a, 84b and 84c and subjects the thus readout image data to the synchronization (and interpolation). Thereafter, at a processing step S840, other predetermined image processings are performed in the image processing section 85.

It should be noted here that the color imaging device is not limited to the one as shown in FIG. 11 but the device may often not have, for example, the memories 84a, 84b and 84c for the respective colors However, the aberration correction should be basically performed on the image data obtained by subjecting the image signals fetched by the CCD to the A/D conversion and the thus corrected image data should be then followed by the synchronization before the predetermined image processings are performed on the image data. If the aberration correction is followed by the synchronization, there is no particular limitation on the order in which these processings, the preprocessings as described above and the LOG conversion are performed. The order depends on the configuration of the device used.

Also in the photo printer shown in FIG. 1, it is preferable to make the aberration correction precede the synchronization (and interpolation) as described above if the mono-plate CCD provided with the color filter array as shown in FIG. 12A is used for example in the scanner.

The method in which the aberration correction precede the synchronization is advantageously applicable not only to commonly used CCDs but also to the so-called honeycomb CCD in which photoreceptors are arranged in a staggered manner. In particular, the honeycomb CCD whose pixel arrangement position is shifted from that of the commonly used CCDs requires not only the correction for the respective colors but also the positional correction. It is thus preferable to make the aberration correction precede the positional correction.

In the above-described embodiments, the aberration correction processing for correcting the aberration due to a lens is followed by various predetermined image processings. However, depending on the predetermined image processing, it is preferred to perform the predetermined image processing prior to the aberration correction processing.

As such image processing, for example, automatically performed dust/flaw elimination processing is given as an example. The automatically performed dust/flaw elimination processing utilizes a light source having a fourth wavelength such as IR (infrared radiation) so as to automatically detect the position of dust or a flaw for automatic elimination thereof. A method of detecting and correcting dust/flaw is not particularly limited. For example, a known method disclosed in commonly assigned JP 11-75039 A, JP 2001-24895 A or JP 2001-24884 A is suitably applicable.

The reason why the automatic dust/flaw elimination processing is performed as the predetermined image processing prior to the aberration correction processing in the above-described manner is as follows: Unlike the above-described manually performed dust/flaw elimination processing, if the aberration correction processing is followed by the automatically performed dust/flaw elimination processing, it is presumed that the accuracy of detecting dust/flaw and the correction performance are lowered due to interpolation processing and the like as compared with those before the aberration correction is performed.

Although the image processor of the present invention has been described above in detail, the present invention is not limited to the above embodiments. It is apparent that various modifications or changes are possible as long as they do not depart from the summary of the present invention.

As described above, according to the present invention, the image deterioration due to a lens is corrected in the case of photographing with a low-price compact camera, a digital camera, a film-with-lens camera or the like. In particular, inconveniences in the image quality occurring by performing the aberration correction processing are prevented whereupon an image of higher quality is obtained.

What is claimed is:

1. An image processor comprising:
    means for performing aberration correction processing for correcting aberration due to a photographic lens on input image data obtained from an image optically photographed through the photographic lens of a camera; and
    means for performing predetermined image processing on the input image data so as to obtain output image data,
    wherein the predetermined image processing is performed after the aberration correction processing; and
    wherein, in the case where the predetermined image processing is processing requiring an approximate position to be specified in advance so as to perform the image processing, the predetermined image processing is performed in any one of two ways: the approximate position is specified in consideration of a shift of a specified position due to the aberration correction processing, and the aberration correction processing is performed, after which the predetermined image processing is performed; and the aberration correction processing is performed on the image data, and the approximate position is specified to the image data which has been subjected to the aberration correction processing, after which the predetermined image processing is performed.

2. The image processor according to claim 1, wherein the predetermined image processing is one of red-eye correction processing, cross filter processing, and dust/flaw elimination processing.

3. The image processor according to claim 1, wherein the aberration correction processing is followed by synchronization when the input image data is synchronized prior to performing the predetermined image processing.

4. An image processor comprising:
    means for performing aberration correction processing for correcting aberration due to a photographic lens on input image data obtained from an image optically photographed through the photographic lens of a camera; and
    means for performing one or more of the predetermined image processing methods of soft focus processing, monotone processing, mask processing, red-eye correction processing, cross filter processing, or sharpness processing on the input image data so as to obtain output image data,
    wherein the predetermined image processing is performed after the aberration correction processing; and
    wherein, in the case where the predetermined image processing is processing requiring an approximate position to be specified in advance so as to perform the image processing, the predetermined image processing is performed in any one of two ways: the approximate position is specified in consideration of a shift of a specified position due to the aberration correction processing, and the aberration correction processing is performed, after which the predetermined image processing is performed; and the aberration correction processing is performed on the image data, and the approximate position is specified to the image data which has been subjected to the aberration correction processing, after which the predetermined image processing is performed.

5. The image processor according to claim 1, wherein the input image data is digital data and the aberration correction processing is performed by calculating a correction amount of the input image data for each digital data, based on aberration correction information corresponding to lens characteristics of the photographic lens.

* * * * *